Oct. 19, 1948.    G. A. TINNERMAN ET AL    2,451,591
FASTENING DEVICE
Filed March 6, 1947

Inventors
GEORGE A. TINNERMAN
LAURENCE H. FLORA
H. G. Lombard
Attorney

Patented Oct. 19, 1948

2,451,591

UNITED STATES PATENT OFFICE 2,451,591

FASTENING DEVICE

George A. Tinnerman and Laurence H. Flora, Cleveland, Ohio, assignors to Tinnerman Products, Inc., Cleveland, Ohio, a corporation of Ohio Application March 6, 1947, Serial No. 732,774

12 Claims. (Cl. 24—213)

This invention relates, in general, to snap fastening devices and is directed to various improvements in the construction of a resilient stud type of clip fastener which has a wide range and variety of applications and uses for the securing of two or more parts in assembled relation in an installation.

More particularly, the invention pertains to clip fasteners of this character which comprise one-piece sheet metal snap stud devices that are provided at comparatively low cost from ordinary sheet metal strip stock with little loss or waste of material and which embody an improved, stronger, and more durable construction than heretofore known similar devices.

In the general construction of clip fasteners in which the fastener blank defines the head of the clip and the spring stud type of shank is formed by a strip carried by the head in projecting relation thereto, the end of the strip usually extends free and unsupported relative to the head of the fastener. When such a clip is applied to an installation, the free end of the strip forming the clip shank is necessarily subject to spreading apart from the head of the fastener under ordinary tensile loads and axial forces which develop in the use of the installation, with the result that the secured parts are not tightly fastened in the manner intended, and the clips frequently work loose and often become completely removed from effective fastening position.

A primary object of the invention, therefore, is to provide an improved construction of a clip fastener of the kind described in which the strip forming the clip shank is interconnected at its free end with the head of the clip in a manner which develops greatly increased strength in the clip, and which otherwise adds to the effectiveness of the securing action of the fastener in applied fastening position in an installation.

A further object of the invention is to provide such a clip fastener construction which is adapted to withstand any tendency of the shank to separate from the head member either in the application of the fastener or incidental to its use in a completed installation.

Another object of the invention is to provide a clip fastener of this character which is particularly adapted for application in blind fastening locations by an operation taking place entirely from one side of the installation and includes further, provision for readily removing the clip by a similar operation, whenever necessary or desirable.

An additional object is to provide a one-piece clip fastener of the kind described which includes an integral cap member in its construction that serves to cover and conceal the opening through which the clip is applied to provide a neat and artistic appearance and otherwise to minimize the passage of dust and other foreign matter through the fastener receiving opening.

Further objects and advantages of the invention will be readily apparent as the following description proceeds with reference to the accompanying drawings, for purposes of illustration but not of limitation, in which like reference characters designate like parts throughout, and in which.

Figure 5:
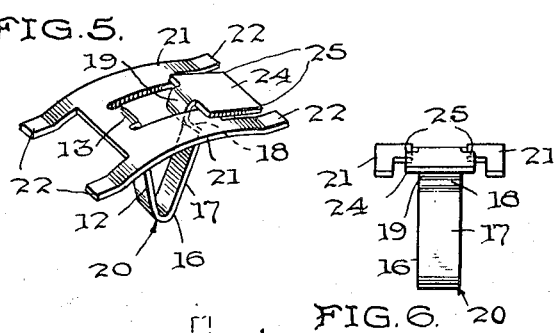
Figures 6, 7:
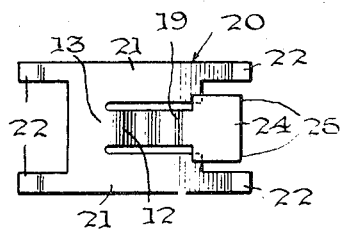
Figure 8:
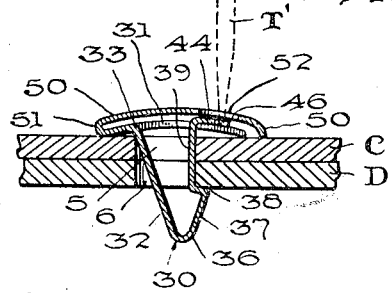
Figure 9:
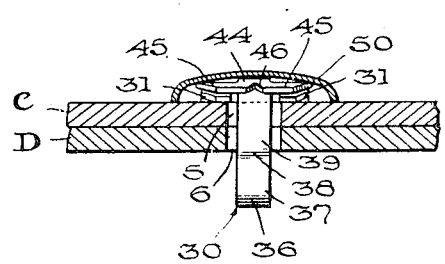
Figure 10:
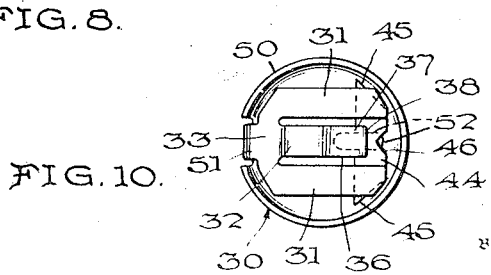

Fig. 5 a perspective view of a further form of the improved clip fastener;

Fig. 6 is an end elevational view of the clip shown in Fig. 5; and,

Fig. 7 is a top plan view of the clip fastener shown in Figs. 5 and 6;

Fig. 8 is a sectional view of an installation showing the application of another form of the improved clip fastener having a cap member, illustrated in section;

Fig. 9 is a sectional view looking from the right of Fig. 8; and,

Fig. 10 is a bottom plan view of the clip fastener per se shown in Figs. 8 and 9.

Figure 1:
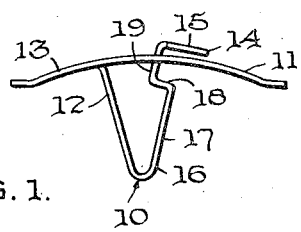
Fig. 1 is a side, edge elevational view of one form of the improved clip fastener of the invention.
Figure 4:
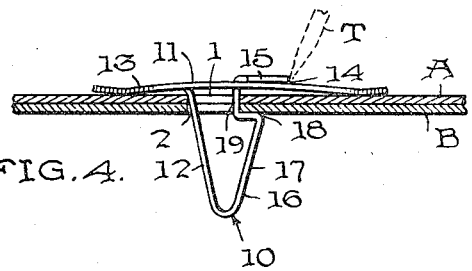
Fig. 4 is a sectional view showing the clip fastener of Figs. 1-3 inclusive as applied to secure an installation of superposed apertured parts.
Figure 2:
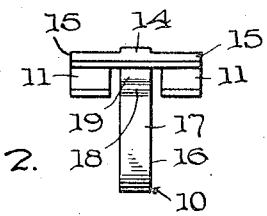
Fig. 2 is an end elevational view of the fastener shown in Fig. 1 as seen from the right of Fig. 1.
Figure 3:
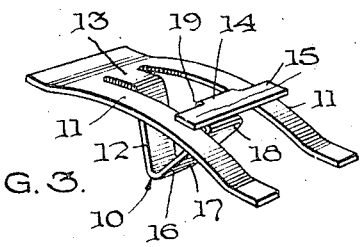
Fig. 3 is a perspective view of the clip fastener per se.

Referring now, more particularly, to the drawings, Figs. 1-3 inclusive show one form of the improved clip fastener of the invention, and Fig. 4 the relation in which it is used to secure a pair of superposed apertured parts A, B, representing an installation of general utility. Either of said parts may be the supporting part in the form of a panel, flange, or other structural member. The parts to be secured are provided with one or more aligned fastener receiving openings 1, 2, respectively, as may be necessary depending on the number of fasteners needed to secure an installation with the required strength and rigidity. Likewise, in an installation in which the clip fasteners are designed for retaining a flange edge of a panel in superposed relation to a support, the support is provided with the necessary openings for attaching the clip fasteners thereto in position for snap fastening engagement with the flange edge of the panel.

The parts A, B, of an installation may be of any suitable metal, wood, or fibre board material and the openings 1, 2, therein, may be round, rectangular or of any other suitable outline, but generally are provided in the manner of circular holes which involve the least cost inasmuch as only the simplest punching or drilling tools are required. The clip fastener designated generally 10, Figs. 1–4 inclusive, is a simple, inexpensive article of manufacture which may be constructed from any suitable sheet metal material, preferably spring metal such as spring steel or cold rolled steel having spring-like characteristics. The devices may be formed from blanks of various outlines, of course, but from a quantity production standpoint, are most advantageously provided from a comparatively small, generally rectangular blank which may be obtained from ordinary sheet metal strip stock with little loss or waste of material.

The sheet metal blank is slit longitudinally to define a pair of spaced head sections 11 on either side of a central strip 12 which is joined to said head sections by an integral body portion 13 at one end of the blank. Preferably the head sections 11 have flattened end portions and are arched or bowed generally upwardly intermediate said end portions so that they may be compressed in providing a resilient clamping of the parts of the installation secured by the fastener. The free end of the strip 12 terminates in a T-shaped flange 14 providing oppositely extending lateral projections 15 defined by an end portion of the blank which is substantially the width of the blank.

The central strip 12 is bent into a generally V-shaped shank projecting from the arched or bowed head sections 11, substantially as shown in Figure 1. The inner end of the strip is integral with the body portion 13 and defines a relatively rigid arm extending from the fastener body for the desired length of the shank, as determined by a return bend providing a spring arm 16.

The spring arm 16 extends angularly with respect to the head sections 11 of the fastener to define an inclined guide surface 17 merging into an inwardly extending, pronounced shoulder 18 having an adjacent abutment 19 substantially normal thereto. Said abutment 19 is positioned in the space between the spaced head sections 11 and is connected to the flange 14 which is disposed substantially at right angles to said head sections 11. The lateral projections 15 of said flange, accordingly, overlap the head sections 11 in interconnected relation therewith, and in the applied fastening position of the fastener, said lateral projections bear upon the head sections 11 to support and rigidify the spring arm 16 relative to the head of the fastener, thereby increasing the strength and holding ability of the fastener shank.

The shoulder 18 on the spring arm 16 is provided in accordance with the predetermined thickness of the parts A, B, of the installation. Thus, as shown in Figure 4, with the head sections 11 in substantially flattened or compressed condition in applied fastening position, the shoulder 18 is spaced from said head sections a distance slightly greater than the combined thickness of the parts A, B. In the event that the head sections are flat, the shoulder 18 is spaced from the head sections a distance substantially equal to the thickness of the parts secured. Preferably, the head sections 11 are bowed, as shown, to provide for increased resiliency which permits the fastener to be used to secure parts of different thicknesses, within limits, and otherwise to compensate for manufacturing variations and irregularities in the thickness of the parts secured.

With the fastener provided substantially in the manner described, it is easily and quickly applied to secure the parts of an installation as shown in Figure 4, simply by inserting the leading end of the generally V-shaped shank of the clip into the aligned apertures 1, 2 defining the work opening, and advancing the shank axially by pressure on the head sections 11 of the fastener. The leading end of the shank is sufficiently small to be received readily in the work opening, and as the shank is advanced therein, the inclined guide surface 17 on the spring arm 16 causes a gradual compression of said spring arm toward the rigid arm 12 as necessary for the fastener shank to pass through the work opening to a position in which the shoulder 18 is adapted to spring into engagement with the adjacent underside of the part B adjacent the work opening. When finally applied, the generally bowed head sections 11 are compressed and substantially flattened along with pressure on the flange 14 which permits the shoulder 18 on the spring arm 16 to snap into engagement with the adjacent underside of part B adjacent the work opening, as the compressed spring arm 16 springs outwardly toward its normal untensioned relation. Upon removal of pressure from the compressed head sections 11, said head sections attempt to assume their initial bowed configuration and in so doing, engage the overlapping projections 15 on the flange 14 to exert an axial pull on the spring arm 16 which causes the shoulder 18 to secure the parts of the installation under a continuously effective spring drawing action axially of the fastener shank. At the same time, the arm 12, which is relatively rigid by virtue of its engagement with the adjacent wall of the work opening, urges the shank leg 16 outwardly to cause said shoulder 18 thereon and the abutment 19 to engage the work positively at all times. Thus, the securing shoulder 18 on the spring arm engages the work under spring forces acting both axially and laterally of the fastener shank to provide a firmly and rigidly secured installation. In such applied fastening position, the projections 15 on the flange 14 are in overlapping bearing engagement with the head sections 11 and thereby prevent any movement of the shank leg 16 in a direction toward separation from said head sections of the fastener such that the shank leg 16 is considerably strengthened and reinforced as it secures the parts of the installation under continuously effective spring tension, as aforesaid.

The fastener may be easily and quickly removed from applied fastening position by employing any suitable tool, such as represented at T, Figure 4, to engage the flange 14 for moving the arm member 16 toward the relatively rigid arm member 12 as necessary for the shoulder 18 to lie within the outline of the aligned openings 1, 2, whereupon the shank of the fastener may be withdrawn and the fastener removed from the installation. The fastener is not in any way damaged or mutilated by such removal, and accordingly, may thereafter be reapplied to the same or a similar installation in a repetition of the foregoing described procedure.

Figures 5, 6, and 7 disclose an alternate fastener construction 20 in which the head sections 21 are provided in a generally H-shaped formation to include substantially flat end portions 22. The head sections thus provided are generally bowed or arched intermediate the ends thereof, and, the generally H-shaped formation thereof provides for increased resiliency in the body of the fastener. The shank of the fastener is formed from a central strip portion intermediate the head sections 21 to comprise a relatively rigid leg member 12 which is integral with the fastener body at 13 and a spring arm 16 constructed in a manner similar to that in the form of device just described, including a flange 24 having lateral projections 25 which overlap the head sections 21. This form of fastener otherwise has the same general construction and is adapted to be applied and used in the same general manner as the fastener described with reference to Figures 1–4 inclusive.

Figures 8, 9, and 10 disclose a further embodiment of the invention comprising a fastener 30 having the same general, interconnected shank and head construction as the previously described forms of the invention, and includes, in addition, an integral cap member which provides the fastener in an embellished design for use in installations in which it is desired that the fasteners have a neat and artistic appearance in applied fastening position. The fastener 30 comprises, in general, a pair of spaced, generally bowed or arched head sections 31 between which there is formed a strip portion defining a relatively rigid arm 32 which is integral with the fastener body at 33. In the example shown in Figures 8 and 9, the parts C, D of the installation are relatively thick, and accordingly, the arm 32 is formed with a return bent spring arm 36 having a relatively short outwardly inclined guide surface 37 and an inwardly extending shoulder 38 provided on the spring arm as necessary to accommodate the combined thickness of the secured parts of the installation. The shoulder 38 merges into an abutment 39 extending generally normal thereto between the head sections 31 and carrying a flange 44 disposed at right angles to the head sections and having lateral projections 45 overlapping said head sections. The extremities of said lateral projections are trimmed to lie within the contour of the cap member 50 of the fastener as shown in Figure 10, while said flange 44 is provided with a tool receiving notch 46 on the free end thereof.

The cap member 50, preferably, is an annular, dished, button-like member which is united to the body portion 13 of the fastener by an integral, return bent connecting web or junction 51 on a portion of the periphery of the cap member. A slot 52 in the cap member is provided to pass a pointed tool T', such as represented in dotted lines in Fig. 8, for engagement in the notch 46 on the flange 44 in order to effect a release of the shank whenever necessary or desirable to remove the fastener from the installation.

The fastener thus provided is adapted to operate in substantially the same manner as the form of the invention described with reference to Figs. 1–4 inclusive. The shank of the fastener is readily received in the work opening defined by the aligned apertures 5, 6 in the parts C, D, and upon pressure on the cap member 50, the shank of the fastener is snapped into applied fastening position substantially as shown in Figure 8. In this position, the rigid arm 32 engages the adjacent wall of the aperture 5 in part C and urges the spring arm 36 outwardly in a manner to force the shoulder 38 and abutment 39 into positive fastening engagement in the work opening. On the outer surface of the installation, only the ornamental cap 50 is exposed to view in the manner of a finishing button, or the like, such that a neat and artistic appearance is provided. This form of clip fastener of the invention otherwise is particularly advantageous in that the cap member 50 thereof serves to cover and conceal the work opening to which the clip is applied and thereby minimizes the passage of dust and other foreign matter through this fastener receiving opening.

Removal of the fastener, if desired, is easily and quickly effected by an operation taking place entirely from the outer surface of the installation, simply by applying the point of tool T', Fig. 8, through the slot 52 in the cap member into engagement with the notch 46 in the flange 44. Upon movement of the tool toward the left in Figure 8, the tool point moves the length of the slot 52 and this compresses the spring arm 36 toward the relatively rigid arm 32 as necessary to lie within the work opening defined by the aligned apertures 5, 6, whereupon the shank of the fastener may be readily withdrawn and removed from the installation.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a strip of metal defining a head section and a bent portion projecting from said head section to provide a shank comprising a dependent arm and a return bent spring arm having a projection overlapping said head section in interconnected relation therewith, one of said arms having a shoulder designed for snap fastening engagement with a part to be secured.

2. A fastener comprising a strip of metal defining a generally arched head section and a bent portion projecting from the concave surface of said head section to provide a shank comprising a dependent arm and a return bent spring arm having a projection overlapping said head section in interconnected relation therewith, one of said arms having a shoulder designed for snap fastening engagement with a part to be secured.

3. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm having a projection overlapping one of said head sections.

4. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm having a projection overlapping at least one of said head sections, one of said arms having a shoulder adapted for snap fastening engagement with a part to be secured.

5. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm having a projection overlapping at least one of said head sections, said spring arm comprising an outwardly inclined guide surface merging into an inwardly extending shoulder adapted for snap fastening engagement with a part to be secured.

6. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm extending through the space between said spaced head sections and having a flange defining lateral projections overlapping said head sections.

7. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm extending through the space between said spaced head sections, said spring arm comprising an outwardly inclined guide surface merging into an inwardly extending shoulder and a flange defining lateral projections overlapping said spaced head sections.

8. A fastener comprising a piece of sheet metal defining a body portion including a pair of spaced generally arched head sections extending in the same general direction, a strip portion united to said body portion between said spaced head sections and bent to project from the concave surface thereof to provide a shank comprising an arm dependent from said body portion and a return bent spring arm extending through the space between said spaced head sections, said spring arm comprising an outwardly inclined guide surface merging into an inwardly extending shoulder and a flange defining lateral projections overlapping said spaced head sections.

9. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm having a projection overlapping at least one of said head sections, and a cap member united to said body portion and overlying said body portion and head sections.

10. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm extending through the space between said spaced head sections and having a flange defining lateral projections overlapping said head sections, and a cap member united to the body portion and overlying said body portion and head sections.

11. A fastener comprising a piece of sheet metal defining a body portion including a pair of spaced head sections extending in the same general direction, a strip portion united to said body portion between said spaced head sections and bent to provide a shank comprising an arm dependent from said body portion and a return bent spring arm having a projection overlapping at least one of said head sections, and a cap member united to the body portion and overlying said body portion and head sections, said cap member having a slot adapted to receive a tool for actuating said spring arm toward the dependent arm for releasing the fastener from applied fastening position.

12. A fastener comprising a piece of sheet metal defining a body portion including a pair of spaced head sections extending in the same general direction, a strip portion united to said body portion between said spaced head sections and bent to project therefrom to provide a shank comprising an arm dependent from said body portion and a return bent spring arm extending through the space between said spaced head sections, and having a flange defining lateral projections overlapping said head sections, and a cap member united to the body portion and overlying said body portion and head sections, said cap member having a slot adapted to receive a tool for actuating said spring arm toward the dependent arm for releasing the fastener from applied fastening position.

GEORGE A. TINNERMAN.
LAURENCE H. FLORA.

REFERENCES CITED

The following references are of record in the file of this patent:

UNITED STATES PATENTS

| Number | Name | Date |
|--------|------|------|
| 656,196 | Lovejoy | Aug. 2, 1900 |
| 2,223,622 | Kost | Dec. 3, 1940 |
| 2,322,656 | Murphy | June 22, 1943 |

FOREIGN PATENTS

| Number | Country | Date |
|--------|---------|------|
| 223,259 | Great Britain | Aug. 8, 1923 |